Figure 1:
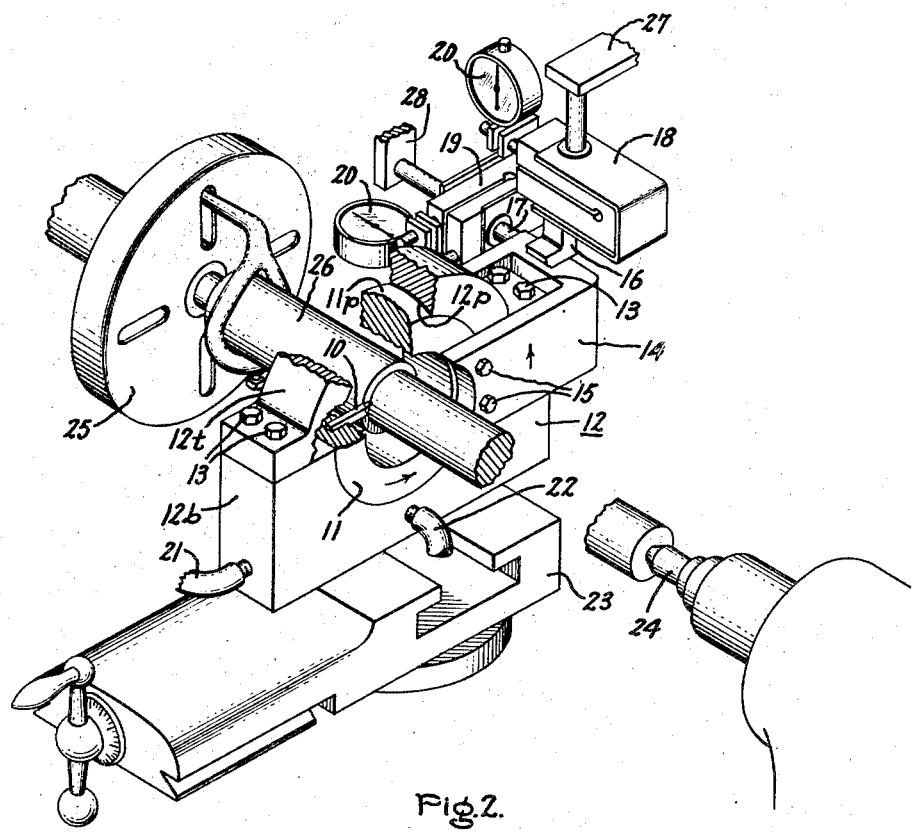

May 3, 1955     F. M. METRAILER     2,707,392
TOOL FORCE GAUGE

Filed Sept. 14, 1951     2 Sheets-Sheet 1

Inventor:
Francis M. Metrailer,
by Richard E. Hosley
His Attorney.

May 3, 1955

F. M. METRAILER 2,707,392

TOOL FORCE GAUGE

Filed Sept. 14, 1951

2 Sheets-Sheet 2

Inventor:
Francis M. Metrailer,
by Richard E. Hosley
His Attorney.

United States Patent Office 2,707,392
Patented May 3, 1955

2,707,392

TOOL FORCE GAUGE

Francis M. Metrailer, Fort Wayne, Ind., assignor to General Electric Company, a corporation of New York Application September 14, 1951, Serial No. 246,667

5 Claims. (Cl. 73—133)

My invention relates to a tool force gauge and has particular significance in connection with a cutting tool holder adapted to be used in conjunction with rotating stock being machined by a tool in the holder and where it is desirable to measure the forces exerted by the stock on the tool as an indication, for example, of machinability of the stock, or of condition of the cutting tool, or of permissible depth of cut.

It has been known in the past to have machinability indicators, but the existing equipments are generally characterized by inaccuracy and high initial cost. Among the reasons for these prior art defects has been the fact that measurement of force is generally accompanied by movement, and since in the prior art equipment such movement is tangential to the work, any measurement promptly results in a change in depth of cut and consequently in change of cutting force.

It is an object of the present invention to provide simple and inexpensive means for overcoming the above-mentioned difficulties.

A further object of the present invention is to provide a tool force gauge which rotates on the same axis as the work so that any movement required for measurement will be peripheral of the work, thereby to eliminate inaccuracies heretofore experienced in equipment of the broad general type.

A further object of the present invention is to provide a low cost tool force gauge equipment of extreme accuracy.

In accordance with one aspect of my invention, I eliminate the inaccuracies and high initial cost of conventional tool force measuring equipment by making the tool holder rotatable on the axis of the work, thereby causing the tool and tool holder in which forces are normally induced to move on the same axis as the stock being machined so as to always provide the same depth of cut. In this connection, I use mating convex concave bearing surfaces for mounting the tool holder about or within the work. In the illustrated embodiment, an inner spherical bearing member and an outer channelled bearing member are separated by a small clearance through and around which the inner member comprising the tool holder must move, and it is during such movement that force indication is measured, by instruments associated with the movable bearing member to read both tangential and axial forces. In practicing my invention in its broader aspects, it will occur to those skilled in the art that the relationship between the inner and outer members may be reversed, and the inner member may be the stationary member and the outer member the tool holder and the force transmitting member, an arrangement particularly suitable if an internal cut is being made on externally revolving work as in a boring machine.

Figure 2:
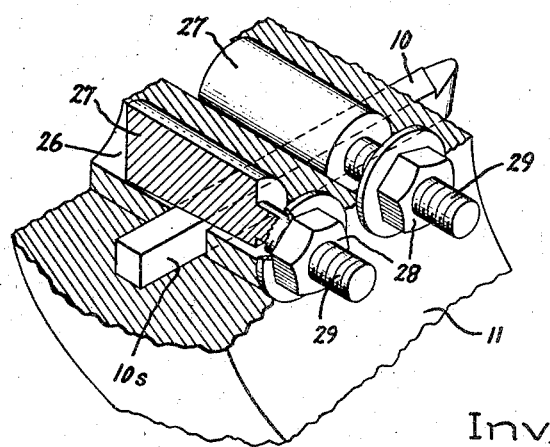
Figure 3:
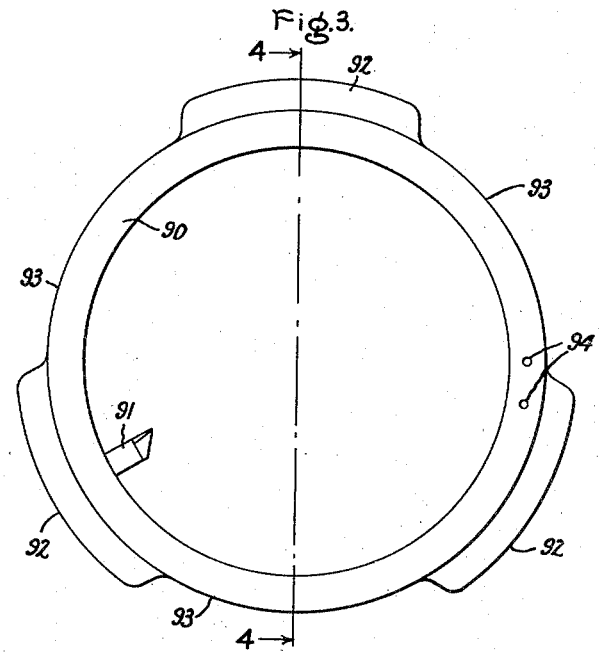
Figure 4:
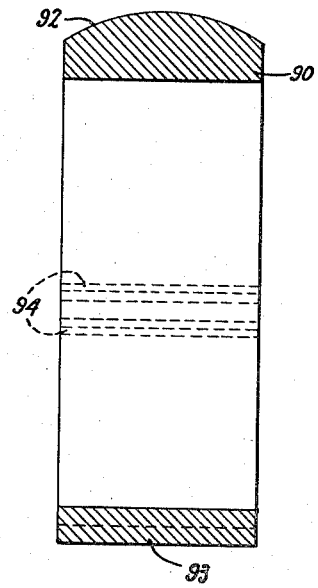
Figure 5:
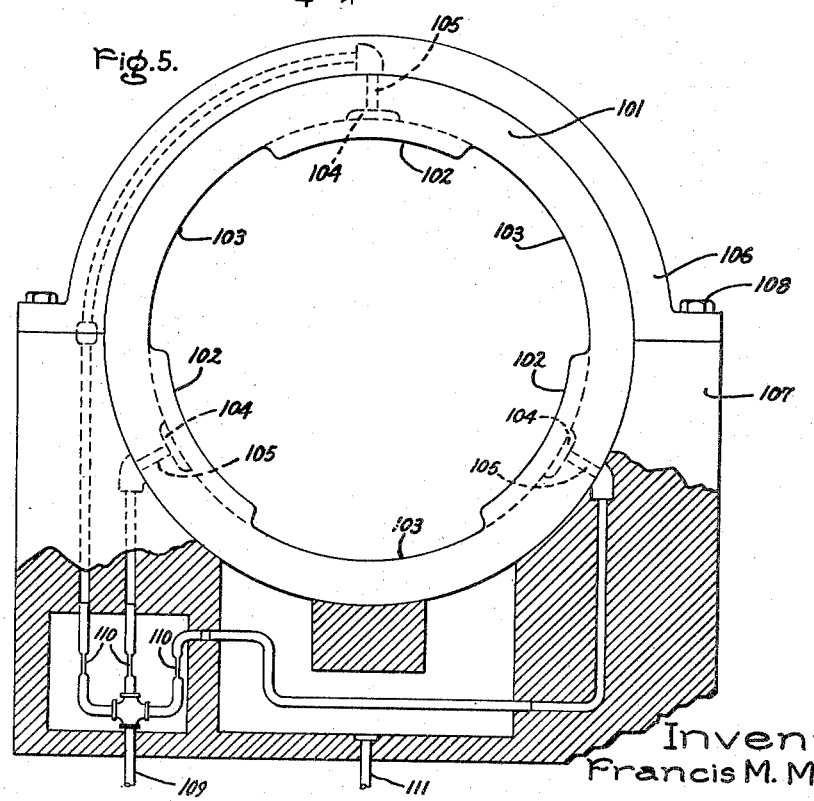

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a perspective view of portions of a lathe equipped with the tool force gauge equipment of the invention; Fig. 2 is a perspective sectional view of the tool-holding inner race 11 of Fig. 1 and showing a method of mounting a tool therein; Fig. 3 shows a modified inner race; Fig. 4 is a cross-sectional view on the line 4—4 of Fig. 3; and Fig. 5 is an elevational view of a solid outer race 101 adapted to interfit with the inner race of Figs. 3 and 4.

As illustrated in Fig. 1, the tool force measuring equipment of the invention comprises means for mounting a cutting tool 10 within a spherical seat bearing inner race 11. Race 11 serves as a floating holder for the cutting tool and, to this end, it is mounted in a stationary outer race 12 provided with an inner periphery 12p channelled to form a small clearance with the semispherical outer periphery 11p of inner race 11. As shown in Fig. 1, the outer race is split into a top portion 12t and a bottom or base portion 12b; 12t and 12b being bolted together as by a plurality of bolts 13. The accuracy of the clearance between the two surfaces is believed to be of importance and oil is introduced to this clearance to form an adjustable resistance to small movement of the inner race with respect to the outer race, thereby to permit the floating tool holder to move and thereby record deflection as a measurement of force, as hereinafter more fully explained. The contact surfaces of the spherical convex surface of the inner race and on the channelled concave surface of the outer race are finished with a high degree of surface finish, and the clearance may be on the order of .0003 inch clearance between the surfaces. The floating tool holder inner race 11 is not only adapted to hold the cutting tool 10, but also hold a lever arm 14 which is mounted on this inner race as by means of a plurality of machine screws 15. The far end of the lever arm is provided with an upward extending projection 16 and an axially extending projection 17 which, respectively, engage the movable faces of otherwise stationary strain gauges 18 and 19, respectively; 18 being provided to furnish an indication of tangential cutting force, and 19 being provided to furnish an indication of axial thrust force during the cutting cycle. Strain gauges 18 and 19 are conventional and need not be further described except to say that in the illustrated embodiment each is shown provided with an indicating gauge 20 for visual indication of the forces imposed upon the movable element of the respective gauge. Oil under pressure is introduced to the base portion 12b through a lubricant feed conduit 21 and passes through channels (not shown) in the base 12b to the clearance between the peripheries of inner and outer mating bearing members, and from there it passes back to other channels in the base member and out an oil discharge conduit 22. If desired, the oil may be supplied through a plurality of restricting tubes to a plurality of concentrated points at which fluid pressure pads are located and flow therefrom around the clearance to the base of the assembly as described and claimed in copending application, Serial No. 246,619, filed September 14, 1951, in the name of Phil S. Potts, entitled "Dynamometer Trunnion Bearing" and assigned to the assignee of the present invention.

In Fig. 1, I have shown the outer bearing race base 12b supported for axial movement on a conventional lathe cross slide 23. While all the parts of the accompanying lathe are not shown, it is assumed that the lathe is provided with other conventional parts such as a tail stock dead-center 24 and a rotatable head stock 25 equipped with the usual appurtenances for holding a piece of work stock, such as a shaft 26, which is shown being machined by the tool 10.

In operation, oil is introduced through conduit 21 under sufficient pressure to positively separate the bearing surfaces, and this provides a condition consisting essentially of a rigidly supported tool which is free to move in any direction within the confinement of the oil film under pressure. The strain gauges each have one side fastened rigidly to a relatively stationary member such as parts diagrammatically shown at 27 and 28 and assumed fixed for movement with the bearing base 12b. As already indicated, the axial cutting force is measured by gauge 19 and its dial 20 while potential bending movements are held to an absolute minimum, both while causing registration on this dial and on the other dial 20 (of gauge 18) which reads tangential or peripheral cutting tool movement.

For the purposes of simplicity, Fig. 1 does not indicate how the tool is mounted in the inner bearing race, but it will be obvious from an inspection of Fig. 2 showing a cutaway perspective view of a cutting tool 10 mounted in a spherical bearing inner race 11 that it is readily possible to mount a tool in a solid member as by providing therein wedge-shaped holes 26 extending through the solid member in an axial direction. Wedge-shaped blocks 27, each designed to apply holding pressure to the shank (10s) of the tool, are held in place in the respective holes 26 by nuts 28 engaging threads 29 provided at the adjacent ends of the respective blocks.

For the purposes of simplicity, Fig. 1 has been described for an outer race split into two parts, but since it is of importance that the spherical surfaces of 11 and 12 be of great accuracy with respect to each other, I have found it desirable to make both of these parts solid as this allows a much greater accuracy than is the case if one of them must be made of two halves assembled and held together by bolt pressure of varying degree. As shown in Figs. 3–5, both of the races may be made solid by providing each with cutout portions by means of which they may be assembled together and then rotated to operative position. Such an arrangement is not my sole invention and is described and claimed in copending application, Serial No. 246,620, filed September 14, 1951, now abandoned, in the names of Phil S. Potts and Francis M. Metrailer, entitled "Machine Bearing," assigned to the assignee of the present invention. In accordance with that application, interfitting solid inner and outer bearing races, having respective convex and concave peripheries with portions thereof cut out to allow the two parts to be assembled together, may be provided as shown in Figs. 3–5 (of the present application) in which 90 represents a bearing inner race adapted to hold a tool 91. As shown most clearly in Figs. 3 and 4, circumferentially spaced peripheral portions 92 of inner bearing member 90 are arranged semispherical in axial extent, whereas intervening portions have the raised center cut away to provide peripheral portions flat in their axial extent as indicated at 93. If desired, holes 94, axially extending through tool-holding race 90, may be provided for the purpose of attaching thereto a lever arm for providing indication of forces.

Fig. 5 shows an outer bearing race 101 adapted to accommodate inner bearing race 90, and having peripherally extending channel portions 102 assumed shaped to mate with spherical surfaces 92 with intervening spaces 103 flat axially and of greater circumferential extent than that of inner race peripheral portions 92. Likewise, inner race cutaway portions 93 are of greater extent than the outer race uncutaway portions 102 so that the inner and outer races may be assembled by placing the inner race projections 92 adjacent the flats at 103, moving the parts axially together and then turning one approximately 60 degrees with respect to the other into operative position. As shown in Fig. 5 and as described and claimed in the Potts application, entitled "Dynamometer Trunnion Bearing," already referred to, the bottoms of channel portions 102 may be each provided with a cavity or bearing pad indentation 104 so that when oil is supplied thereto there will be three fluid-bearing pads, one located at each side of the bottom center and one at the top of the bearing. Holes 105 pass radially through the race 101 to establish communication between pad indentations 104 and the outside of the race. The outer race is held in a split housing comprising an upper surrounding half 106 and a base portion 107 with the two clamped around the race by bolts 108.

In accordance with the disclosure in the above-mentioned Potts application, a conduit 109 conducts lubricant under pressure from a source (not shown) into the base 107 and through three equally restricting tubes 110 and therefrom to each of the three supply holes 105 so that with movement of the inner race in any direction tending to block off flow from one pad indentation, there will be a disproportionate drop in the flow through the restricting tubes associated with the other pad indentations, thereby restoring the alignment between races.

In operation, fluid supplied to the fluid pads will exit through the clearance and around the axial ends of the outer race and be collected in the hollow base 107 from which it may be drained from time to time or continually by an exit pipe 111.

While my invention is shown with somewhat spherically shaped mating bearing surfaces, it is not to be considered limited to such an arrangement but obviously includes variations as where a groove with tapered sides or other channel construction is used for the outer bearing race, and the inner race is designed to nest in the channel.

There is thus provided a device of the character described, capable of meeting the objects hereinabove set forth. The arrangement of the invention is not expensive to provide, but it allows extreme accuracy of measurement because radial, peripheral and thrust forces may be readily resisted while inner race is always free to tilt with respect to outer, and rotation of tool will not result in a variation of depth of cut because cutting tool measuring movement rotates on the same axis as the work piece.

While I have illustrated and described particular embodiments of my invention, modifications will occur to those skilled in the art. I desire it to be understood, therefore, that my invention is not to be limited to the arrangements disclosed, and I intend in the appended claims to cover all modifications which do not depart from the true spirit and scope of my invention.

What I claim as new and desire to secure by Letters Patent of the United States is:

1. Tool force gauge apparatus comprising an annular inner bearing race adapted to surround a workpiece and having an outer peripheral surface, and an outer bearing race having a mating inner peripheral surface and being relatively rotatable with said inner bearing race, one of said races having means in the plane of the inner and outer races for mounting a cutting tool therein and having a lever arm arranged to transmit cutting force at a distance, and the other of said races being arranged to support said one race for movement with respect thereto to measure the power required to turn the work-piece with respect to the tool.

2. Tool force gauge apparatus comprising an annular inner bearing race adapted to surround a work piece and having an outer periphery convex in axial extent and an outer bearing race having a mating inner periphery concave in axial extent, one of said races having means in the plane of said inner and outer races for mounting a cutting tool extending toward said work piece and having a lever arm arranged to transmit cutting force at a distance, and the other of said races being arranged to support said one race for movement with respect thereto.

3. In a machinability indicator for a lathe adapted to hold a work piece rotating on an axis and having a cross slide for advancing a tool with respect to said work, the combination of an outer bearing race mounted on said cross slide and having an inner peripheral portion semispherically channel shaped, an inner bearing race arranged coaxial with the axis of said work piece and having an outer peripheral portion semispherically shaped to mate with said outer bearing peripheral portion with a clearance therebetween, means for mounting a tool in said inner bearing race in the plane of said inner and outer races, means including a lever arm extending from said inner race radially beyond said outer race for indicating forces exerted on said tool by said work, means including a pair of strain gauges having portions thereof fixed with respect to said cross slide and portions thereof movable in response to movement of said lever arm for measuring axial and tangential forces exerted on said tool by said work, and means for introducing oil under pressure through said outer race to the clearance between said races to support said tool while allowing limited movement in any direction thereby providing a machinability indicator.

4. The combination of a cutting tool holder comprising an inner bearing race member having an inner periphery and an outer periphery, means for placing rotatable work stock within said inner periphery, means for securing a tool contacting said stock to the inner periphery of said inner race member, said outer periphery being semispherically shaped, an outer bearing race member having a channelled inner periphery and comprising upper and lower portions bolted together about said inner race member outer periphery with a clearance between the mating peripheries of said members, means for introducing a lubricant under pressure to said clearance to rotatably support said inner race member while allowing limited movement thereof in any direction, a lever arm secured for movement with said inner race member and extending beyond said outer race member, a strain gauge arranged fixed with respect to said outer race member and adapted to be actuated by said lever arm for indicating tangential cutting force when said tool contacts said work, and a strain gauge arranged fixed with respect to said outer race member and adapted to be actuated by said lever arm for indicating axial forces imposed on said tool by said work.

5. The combination of a cutting tool holder comprising a solid inner bearing race adapted to surround a work piece and having an outer periphery having a plurality of peripheral portions characterized by raised centers and intermediate peripheral portions flat in their axial extent, a support for said cutting tool holder inner race comprising a solid outer bearing race having an inner periphery having a plurality of peripheral portions characterized by raised channel sides and adapted to mate with said inner race raised center portions with a clearance therebetween, and intermediate peripheral portions having the channel sides cut away to be flat in their axial extent with said flat portions of each member being greater in circumferential extent than the raised portions of the other member so that said solid races may be assembled together by axially aligning raised portions of one with flat portions of the other, axially sliding together and rotating one with respect to the other into operative position, a cutting tool secured to said tool holding inner race and extending toward said work piece, means for indicating cutting forces by relative movement of one of said races with respect to the other, and means for introducing oil under pressure into the clearance between said races to rigidly support said tool while allowing limited movement thereof in any direction.

References Cited in the file of this patent

UNITED STATES PATENTS

| | | |
|---|---|---|
| 1,637,676 | Bohuszewicz et al. | Aug. 2, 1927 |
| 2,054,787 | Beavers et al. | Sept. 22, 1936 |
| 2,477,457 | Hughes | July 26, 1949 |